3,827,963
REFLECTIVITY-RESPONSIVE CONTROL SYSTEM
FOR ELECTROLYTIC FINISHING APPARATUS
Norman F. Callahan, Stevenson, Conn., assignor to Electrometallurgical Sales, Division of the Gilbert Tramer Co., Cleveland, Ohio
Filed Jan. 2, 1973, Ser. No. 320,519
Int. Cl. B01k 3/00; C23b 9/02
U.S. Cl. 204—228
11 Claims

ABSTRACT OF THE DISCLOSURE

In connection with apparatus for anodizing aluminum or electroplating metals and the like, the work-piece which is to be subjected to the electrolysis is held or clamped in a fixture in the electrolytic bath so as to have a regulated light beam focused upon it during the process of electrolysis. The intensity of the light reflected from the work-piece is sensed by a transducer in the form of a photo-electric cell which converts it into an electrical current whose voltage is amplified and fed to an electrical comparator, in the form of a potentiometer, which monitors the changing voltage as the electrolysis of the work-piece proceeds. A target voltage for the comparator is established by one of several alternative means, and when balance is achieved between the target voltage and the transduced reflected light voltage, a process-arrest circuit is actuated or energized which can directly terminate the electrolytic process or can activate a signal by means of which an operator can be altered to terminate the electrolysis. In one modification of the control system which is particularly useful in the control of anodizing procedures, a second comparator device is used which achieves balance before the target voltage is achieved and acts to switch the electrolysis process from a current mode to a voltage mode to minimize halo effect.

BACKGROUND OF THE INVENTION

In the electrolytic finishing of metals or the like, such as in anodizing of aluminum and in electroplating of metals generally, there is frequently a problem of achieving uniformity of finish of different batches of like work-pieces being processed which are sequentially processed through the same or similar electrolytic apparatus at ostensibly uniform control parameters.

Although uniform timing of the duration of the electrolytic process with respect to each like batch of work-pieces is commonly used in an attempt to achieve uniformity of the electrolytic finish, there are a sufficient number of variables in the electrolytic process which cannot be accurately controlled economically in commercial production processes, so that timing alone does not serve to assure uniformity of finish. Such factors as pH of the electrolyte solution, composition, and temperature tend to change from start to finish of the electrolytic processing of each batch as well as changing from one batch to another, and are not overcome or recognized by control systems utilizing uniform timing control.

It is common practice, for example, to anodize for a specific time interval and then remove the panels or work-pieces from the electrolyte and visually compare the color or hue of the work-piece with the color of a sample piece being used as a visual standard. If the work-piece has not attained the proper color, it is returned to the electrolytic process and the anodizing is continued and then interrupted for further visual comparison; this procedure being repeated until the operator is satisfied that uniformity of color or finish has been attained between the work-piece and the sample piece. This type of comparison procedure for attempting to achieve uniformity of surface finish is uneconomic, time-consuming and still subject to human error, as it ultimately relies upon the operator's judgment that uniformity of finish has been attained, based upon a visual comparison of two pieces. Furthermore, the operators' judgment also has to be relied upon for determining the additional length of time that he will expose the work-pieces to the electrolytic process after each interruption for purposes of comparison. This leaves the operator with the problem of deciding at some point whether the anodizing process should be terminated with the work-piece slightly "under-done" or should be resumed with the risk that the work-piece may be "over-done."

The invention is directed to overcoming these problems.

SUMMARY OF THE INVENTION

The primary object of the invention is to provide a control system for electrolytic finishing apparatus which will overcome the problems above-mentioned.

A further object of the invention is to provide a control system for electrolytic finishing apparatus which will automatically monitor the reflectivity of the work-piece continuously during the electrolytic finishing process and compare it to an established standard, without the need for operator judgment or intervention.

Another object of the invention is to provide a control system of the character described which will energize or actuate a circuit element when uniformity of finish is achieved to cause the electrolytic finishing process to be terminated.

Still another object of the invention is to utilize the described form of control system to automatically correct "halo effect" in anodizing processes.

Other objects and advantages of the invention will become apparent during the course of the following description.

DESCRIPTION OF THE PREFERRED EMBODIMENTS

Figure 1:
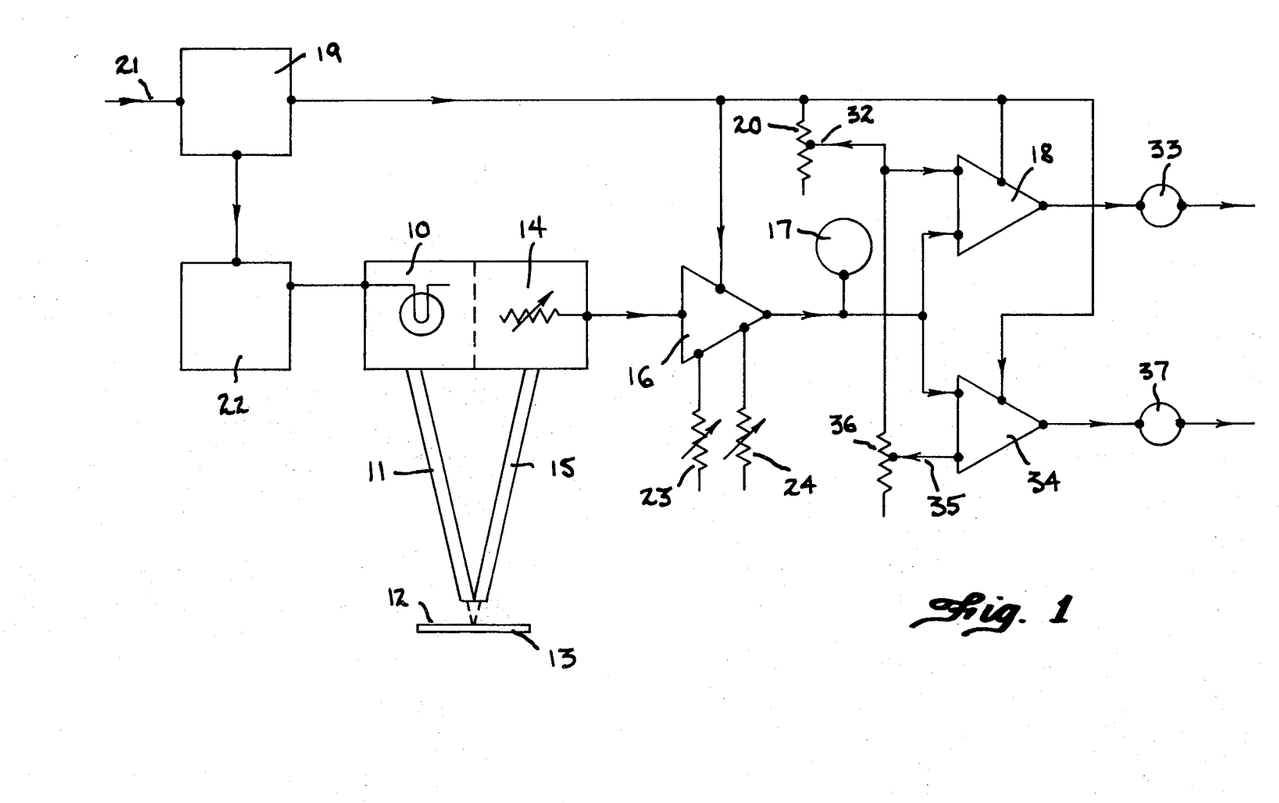
FIG. 1 is a schematic block diagram of one form of control system utilizing the principles of the invention.

FIG. 1 of the drawings schematically illustrates a reflectivity-responsive control system for the purposes above-described. The arrows on FIG. 1 are intended to indicate the direction of the sequence of steps in the control system. The basic elements of the control system are a regulated light source 10 whose light is focused, as by means of a fiber optic light guide 11, on the reflecting surface 12 of the work-piece 13 which is immersed in the electrolyte of the electrolytic finishing apparatus. A transducer 14 in the form of a photo-electric cell, receives the reflected light from the surface 12, as by means of a second fiber optic light guide 15, and converts it into an electrical current which is fed to an amplifier 16. The amplifier output voltage is metered, as at 17, and is fed to a comparator unit 18. The second input to the comparator receives power or voltage from the DC power supply 19 through a setpoint potentiometer 20.

The DC power supply 19 can be a rectifier using AC line power 21 or can be any other suitable form of DC power supply. It provides power for the amplifier 16 and the comparator 18, as well as providing energization of the light source 10 through a voltage regulator 22. The amplifier 16 is provided with the adjustable output controls 23 and 24, one of which is capable of adjusting the amplifier output to 0 volts for a high intensity reflected signal and the other of which acts as a span control to adjust the amplifier output to, for example 10 volts, for a low intensity reflected signal.

Figures 2, 3, 6:
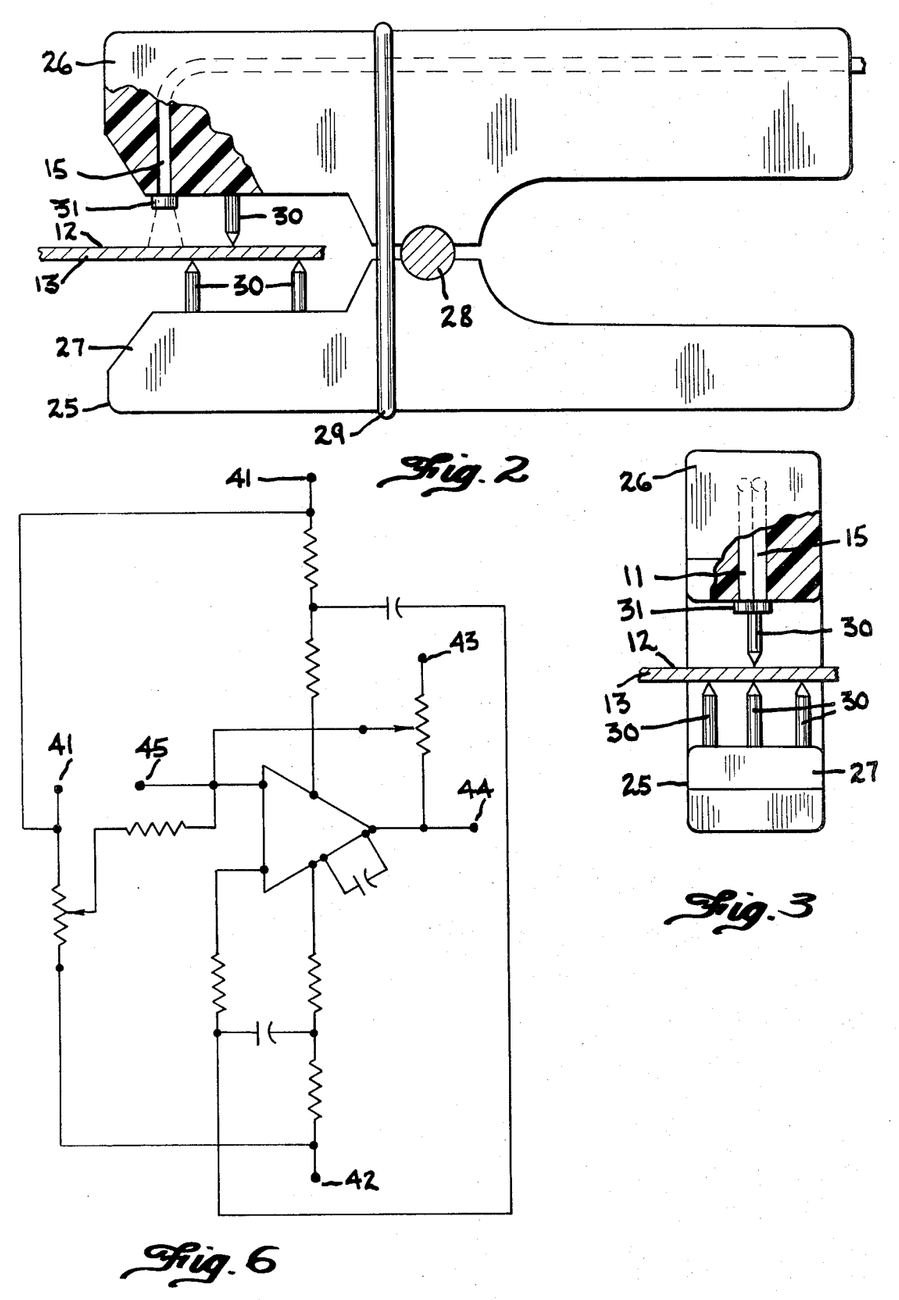
FIG. 2 is a view in side elevation of a form of clamp or fixture which may be utilized in my invention, with a portion thereof broken away to show interior detail.
FIG. 3 is an end elevation of the clamp or fixture shown in FIG. 2, as viewed from the left end of FIG. 2.
FIG. 6 is a circuit diagram of the amplifier shown in block form in FIG. 1.

Assuming now, for purposes of explanation, that the control system is being utilized to control an electrolytic anodizing of aluminum panels on which the operator has had no prior experience, but has been supplied with a sample piece of anodized aluminum whose color is to be matched. As shown in FIGS. 2 and 3 of the drawings, the control system contemplates the use of a fixture or clamp 25, which is here shown as comprising two jaws 26, 27 which are mounted, as at 28, for pivotal movement relatively to each other. The jaws 26 and 27 are retained on the pivot 28 and urged into clamping position by any suitable means, such as the rubber ring or other resilient element 29 which embraces the jaws exteriorly thereof. A plurality of finely pointed support fingers 30 project from the opposed faces of the jaws 26 and 27 and are adapted to grip or clamp a metal panel or other work-piece 13 therebetween, while at the same time utilizing point contact to minimize any significant masking or obstruction of the surfaces of the work-piece which are to be anodized or plated.

Carried by one of the jaws 26 or 27 are the two fiber optic light guides 11 and 15, whose ends are capped by a suitable lens structure 31 by means of which the light guide 11 projects a photo-beam upon the reflecting surface 12 of the work-piece, and the intensity of reflection thereof is sensed and captured by the light guide 15 which transmits it to the transducer 14 to produce the electrical signal or current previously described.

As above indicated if the control settings to be made on the comparator 18 are not known to the operator, he can place the specimen or sample piece in the clamp 25 and immerse it in the electrolyte. If the control system is now energized, the meter 17 will provide a reading of an electrical value related to the intensity of reflection of the finished sample piece. This of course could also be done without immersing the sample piece and clamp in the electrolyte, but a more accurate reading is obtained if the sample piece is immersed. Having observed the reading thus obtained on the meter 17, either in terms of voltage or color or any other suitable form of indicia, the wiper arm 32 or other voltage adjusting means of the comparator potentiometer 20 is adjusted to the same indicia mark or value to establish an electrical target value in the comparator 18 which must be attained to achieve balance.

With the target value on the comparator thus established, the production process can be initiated with a work-piece 13 mounted in the clamp 25, instead of the sample piece which was used as the comparison standard. As the electrolyte finishing process proceeds, the comparator 18 receives the input provided by the reflected light through the photo-electric cell 14 and the amplifier 16 and monitors it constantly in relation to the established target value set by the potentiometer 20. As the anodizing or electroplating proceeds, the reflectivity of the surface 12 of the work-piece changes in intensity until it reaches a point where the input of the amplifier to the comparator attains the electrical target value set by the potentiometer and electrical balance is achieved. This condition of balance actuates a relay 33 to energize a process-arrest circuit which, in the preferred form, operates in any conventional manner to terminate the electrolysis being monitored by opening the operating circuit to the electrolytic finishing apparatus. However, the process-arrest circuit need not necessarily be automatic in operation but could, in less sophisticated form, energize a visible or audible signal to alert the operator to terminate the electrolytic process.

It will be understood that once the electrical target value for the comparator has been established for a particular desired color of the work-piece, the above-described procedure of calibrating the control circuit by means of a test specimen need no longer be utilized. If the target value is known from prior experience or based upon prior production runs, then of course it need merely be set into the comparator and no test specimen is needed. This latter procedure would also be utilized if there were no particular test specimen to be used as a specific color standard but all that was desired was that there be uniformity of color of all subsequent batches with that of the first production batch of work-pieces. In such event, either a pre-selected empirical electrical target value would be set on the comparator 18 or, alternatively, the first batch processed would be terminated based upon an approximate visual examination of the color achieved and the target value of the comparator would then be set for succeeding batches at the electrical value at the point of termination of the electrolysis of the first batch.

As thus described above, there is provided a fully operative and effective reflectivity-response control system which monitors the electrolysis process continuously and actuates a process-arrest circut when an electrical target value has been attained based upon the intensity of light reflection from the work-piece surface. This control system establishes a means for securing uniformity of results of successive production batches of electrolytically finished work-pieces, independently of the need for the exercise of operator judgment or visual evaluation. Those skilled in the art are aware, however, that in the integral color anodizing of large sheets of aluminum, the edges of the sheet receive the color before the center of the sheet because the periphery of the panels is the area of highest current density. This so-called "halo effect" is seldom desired and can be minimized in utilizing by reflectivity-responsive control system by the addition of a second comparator device 34 in parallel with the previously described comparator unit 18. The second comparator 34 can be inoperative and need not be utilized for conventional electroplating or when anodizing small aluminum parts where no significant halo effect occurs. However, when the problem does arise, the purpose of the second comparator 34, which is identical in structure and use to the comparator 18, is to establish a second target value for comparator 34 which is a percentage of the electrical target value established in comparator 18 for termination of the electrolytic process. This sub-target setting or percentage of target value which is set into comparator 34 is determined empirically and could for example be from 90–98% of the electrical target value set into comparator 18. This adjustment is made by the wiper arm 35 or other voltage adjusting means of the setpoint potentiometer 36 of the comparator 34.

When the anodizing process has reached a point where the reflected light signal attains the percentage of the target value which has been established for the comparator 34, the potentiometer 36 is balanced and causes actuation of a relay 37 which, in turn, actuates a process-modification circuit of conventional form which functions to switch the anodizing process from a constant current mode to a constant voltage mode. When using this halo effect arrangement, the fixture or clamp 25 is secured to the work-piece so as to direct the photo-beam upon the edge of the panel being anodized. Inasmuch as the periphery or edge of the panel has a heavier or thicker anodized coating than the center portion of the panel, its electrical resistance is higher so that when the process is converted to the constant voltage mode, the current will be directed to a greater extent to the areas which have the least thickness of coating and therefore the anodized coating of the periphery of the panel will proceed at a lesser rate than that of the center area of the panel so that uniformity of thickness of the anodized coating can be achieved to minimize the halo effect. The value set on the comparator 34 determines the extent to which the anodizing process will continue after the switch-over from constant current mode to the constant voltage mode before the process is terminated. Based upon experience in the art, a proper value setting for the comparator 34 can be empirically established to substantially eliminate the halo effect in aluminum anodizing.

Figure 4:
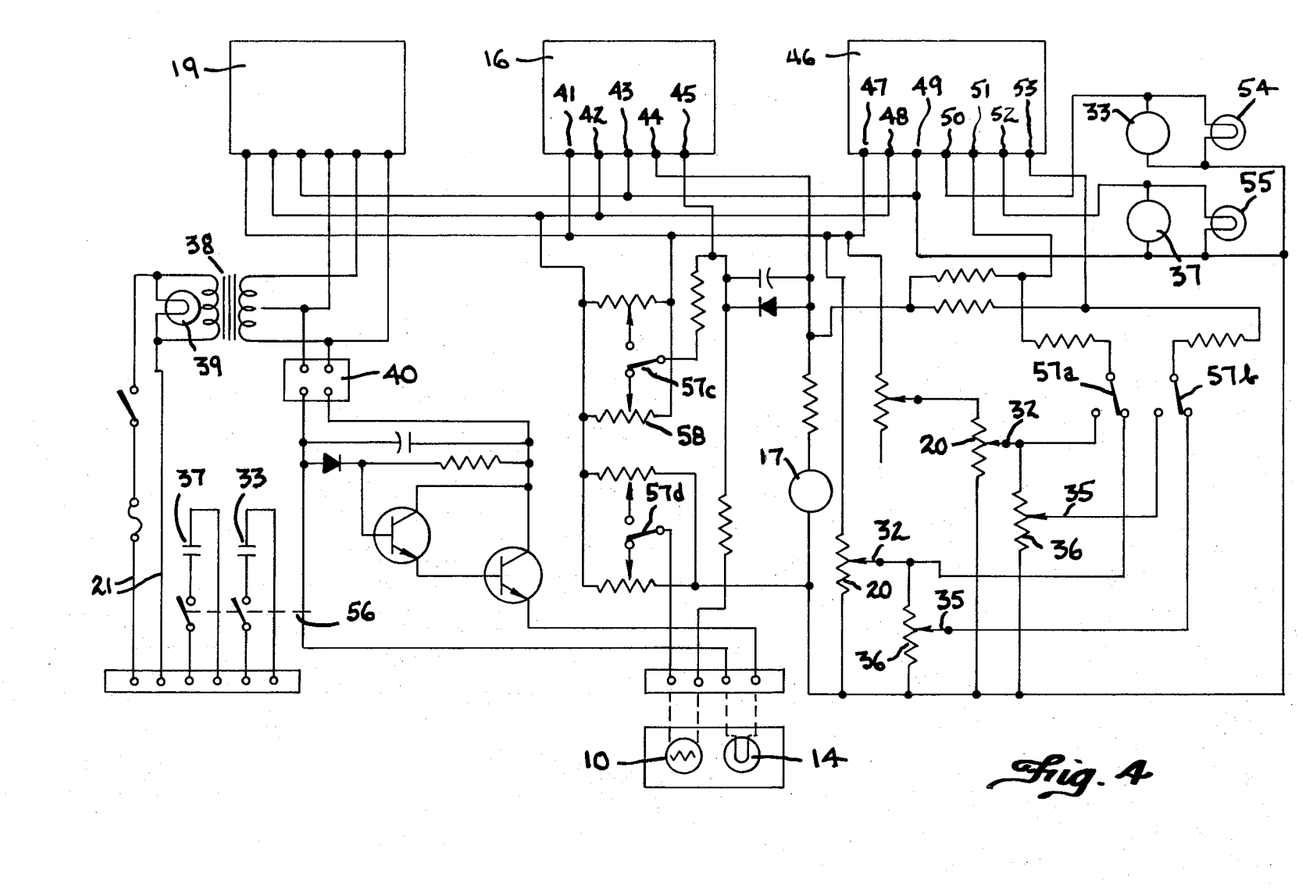
FIG. 4 is a circuit diagram of the control system schematically shown in FIG. 1.

Referring now to FIG. 4 of the drawings, there is shown a circuit diagram for the control system shown diagrammatically in FIG. 1 of the drawings. Conventional electrical symbols are used wherever possible and, where their function is self-evident, no further explanation is given. The block 19 represents the DC power supply, here shown as being fed by the AC power lines 21 through a transformer 38. An indicator light 39 gives visual indication when the power supply circuit is closed.

The box 40 designates four diodes in a bridge circuit for the voltage regulator 22. The box 16 designates the amplifier 16 with terminal connections 41–43 to the DC power supply, terminal 44 is connnected to the input of the dual comparators 18 and 34 which are designated by the box 46, and terminal 45 is connected to the output of the transducer 14. The terminal connections 47, 48 and 49 of the dual comparator 46 are connected to the DC power supply 19, which is ordinarily operated to supply 15 volts. The remaining terminals 50–53 of the dual comparator 46 are connected to the control circuitry as indicated.

Signal or indicator lights 54 and 55 are connected across relays 33 and 37, respectively. A gang switch 56, when closed, serves to shunt the relays 33 and 37 and make them inoperative when the control system is being calibrated, so that there will not be unnecessary interference with the process power supply during the calibration step of the control system. The ganged switches 57a, 57b, 57c and 57d are shown in position for operation of the control circuit using the method where the final set point electrical value of the comparator 18 is already known and has been established for the particular electrolytic process involved. When, as previously described, a sample piece is first placed in the clamp for the purpose of establishing the target value on the comparator 18, then the gang switch 57 is thrown to its alternate position and the variable resistor 58 is utilized to set the electrical target value of the control system. It will be noted that the wiper arm 32 of the comparator unit 18 receives power directly from the power supply 19, whereas the wiper arm 35 of the comparator 34 receives its power from the wiper arm 32. It will be understood that the circuitry shown in FIG. 4 is merely representative of circuitry that could be utilized for the control system diagrammatically shown in FIG. 1, and that variations thereof are possible, as is known to those skilled in the art.

Figure 5:
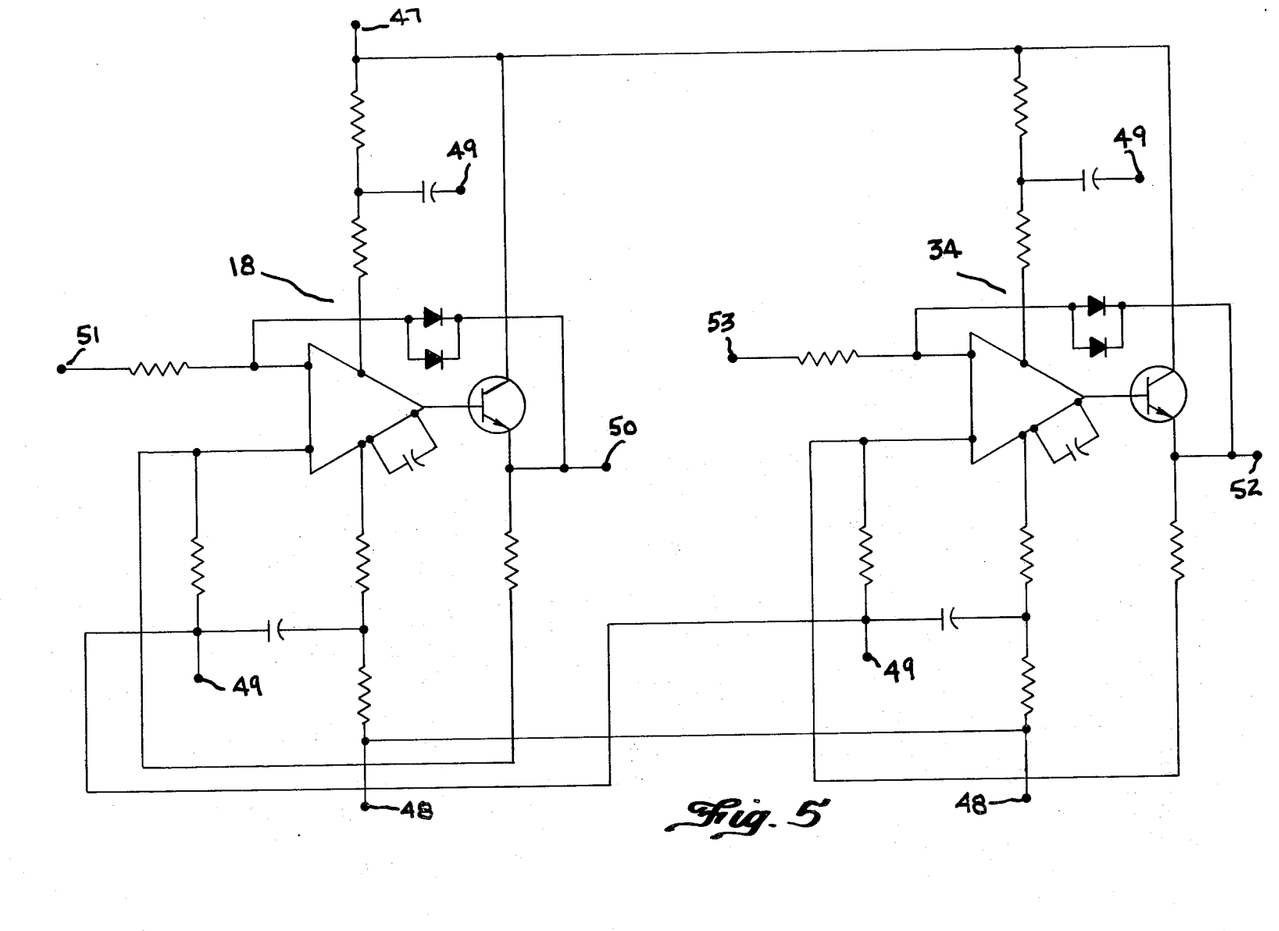
FIG. 5 is a circuit diagram of the dual comparator units shown in block form in FIG. 4.

In FIG. 5 of the drawings there is shown a representative circuit diagram for the dual comparator 46 and showing the connections between the comparators 18 and 34 by reference to the terminal connections 47–53 shown on FIG. 4. FIG. 6 is a representative circuit diagram of the amplifier unit 16 showing its connections to the terminals 41–45, shown on FIG. 4.

Figure 7:
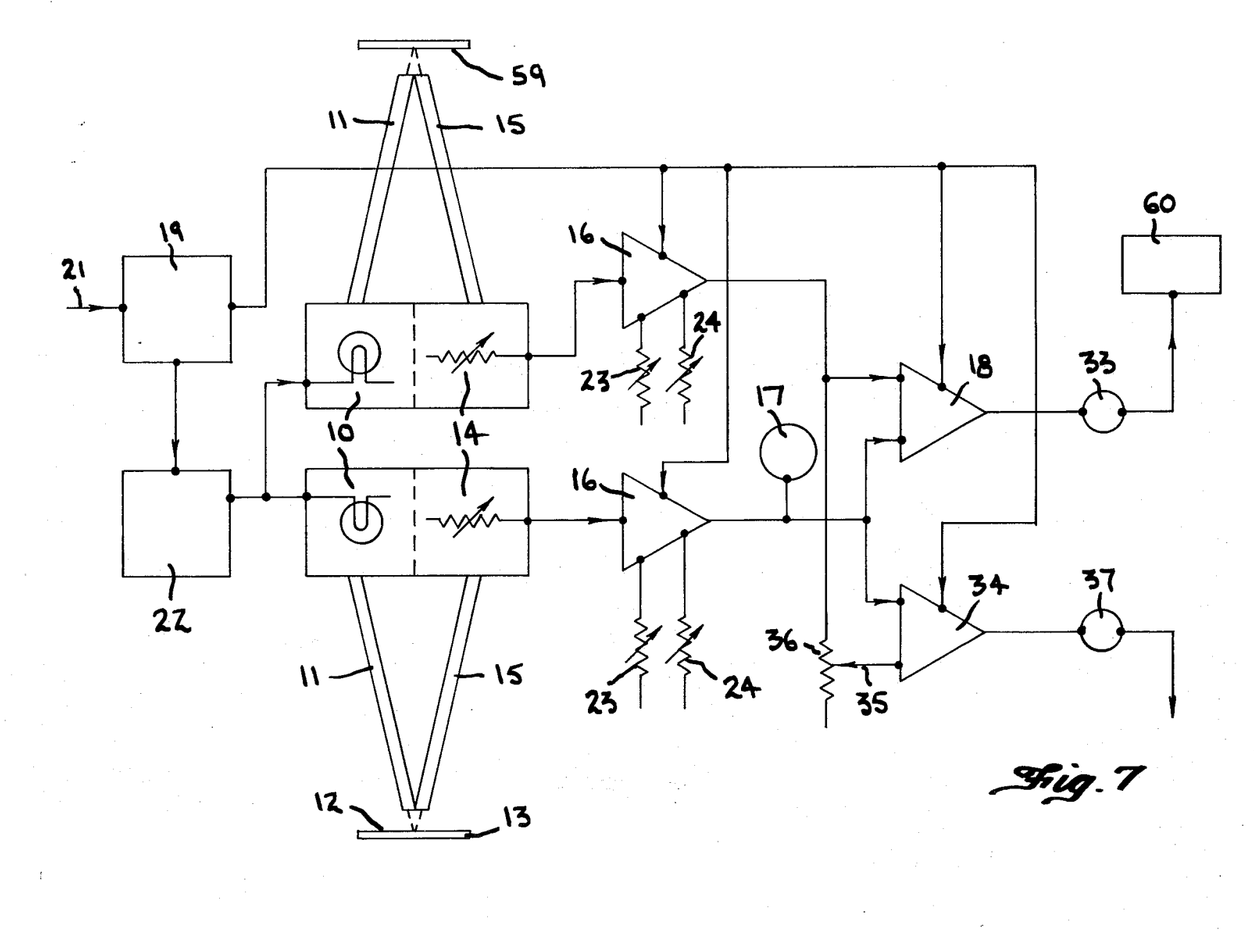
FIG. 7 is a schematic block diagram of a modified form of control system utilizing the principles of my invention.

FIG. 7 of the drawings is a schematic representation of a modified control arrangement, utilizing the principles of the invention, in which the electrical target value for the comparator 18 is established and modulated by a finished work-standard piece 59 held in a second light probe clamp 25 and kept submerged in the electrolytic bath during the entire electrolytic process. The transduced reflectivity signal of the piece 59 is amplified by a second amplifier 16 whose output is connected to the comparator 18 and replaces the voltage adjusting means 32 shown in FIG. 1. By maintaining the standard piece 59 in the electrolytic bath during the anodizing or electroplating process, any variables in the electrolytic bath are sensed as the electrolytic process takes place with reference to the work-piece 13, so that a high degree of uniformity and standardization is attainable. When the target values set by the work-standard piece 59 on the comparator 18 is attained, the relay 33 actuates the process-arrest circuit 60 to either terminate the electrolysis or energize a visible or audible signal which will direct an operator to do so. In this modified control system, just as in the control system shown in FIG. 1 of the drawings, the second comparator 34 is preferably utilized in the anodizing of large aluminum panels to minimize the halo effects, in the maner previously described.

Figure 8:
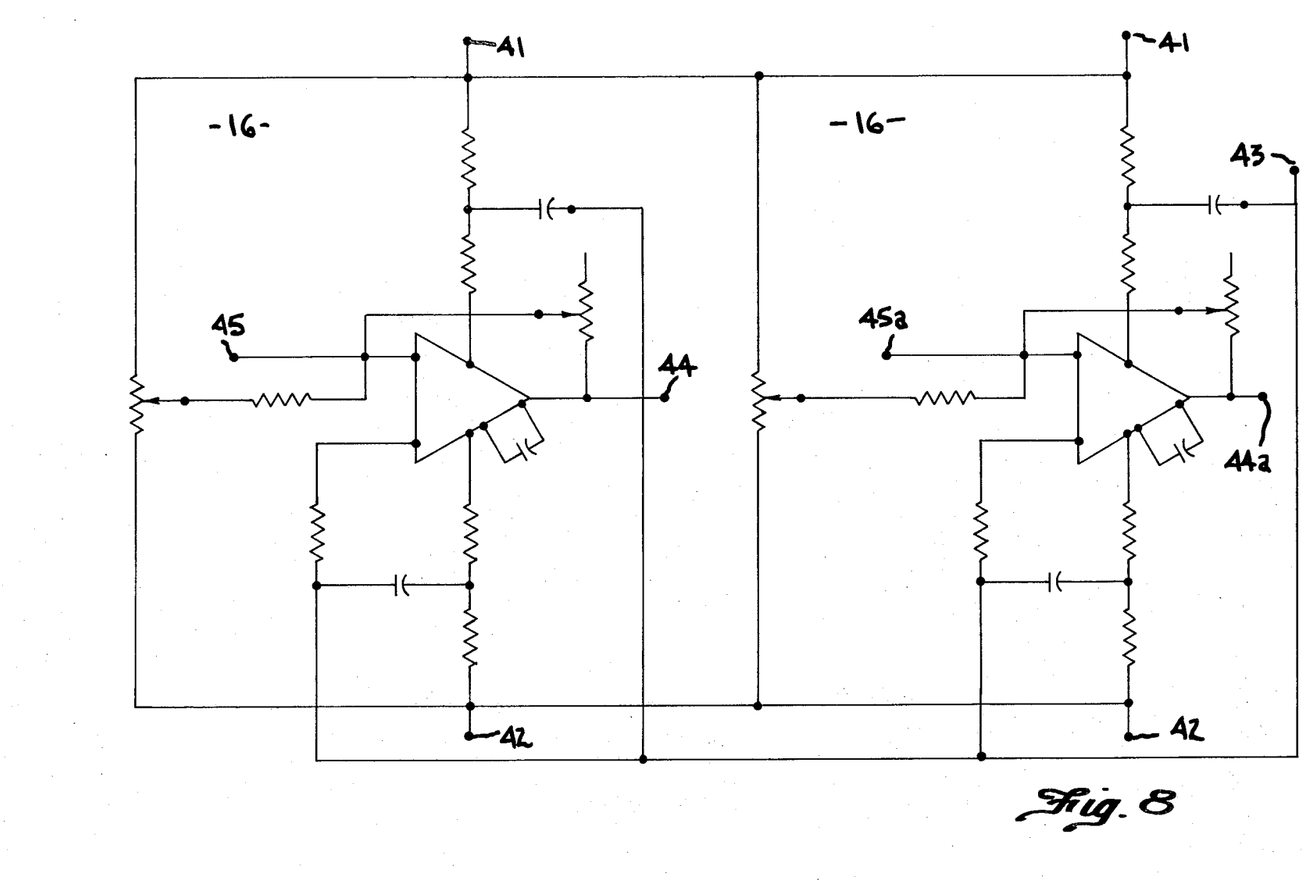
FIG. 8 is a circuit diagram of the dual amplifier arrangement shown in block form in FIG. 7.

In FIG. 8 of the drawings there is shown a circuit diagram of the dual amplifier units, as connected to each other when utilized for the modified control system of FIG. 7 of the drawings. As indicated on FIG. 8, by reference to the terminal connections shown in FIG. 4 of the drawings, most of these connections are common to both amplifiers. However the terminal connections designated 44a and 45a would be comparable to the connections 44 and 45 on the companion amplifier, but independent thereof.

The modified form of control system diagrammatically shown in FIG. 7 of the drawings has the attribute of monitoring and sensing changes in the light transmitting qualities of the electrolyte which may occur during the electrolytic process or between successive batches of work-pieces. Therefore, when an electrolytic process is involved which may result in progressive clouding of the electrolyte or other change in its light transmitting quality, this could have some minor effect on the intensity of the reflected light signal from the work-piece 13 in the arrangement shown in FIG. 1. The effect of this factor is greatly minimized by the fixture 25 which positions the light guides 11 and 15 perpendicular to the surface of the work-piece 13 and at a uniform fixed distance therefrom which is sufficiently close to the surface so as not to be significantly affected by minor changes in the light transmitting quality of the electrolyte. However, where the nature of the electrolytic process is such that there can be radical changes in the light transmitting qualities of the electrolyte, the modified arrangement of FIG. 7 of the drawings accommodates to this condition and compensates for it in the use of the work-standard piece 59. Howeven, if the piece 59 is used repeatedly, it may be subjected to some significant etching effect which will gradually impair its function as a comparative standard. To overcome this difficulty and yet permit the control system to compensate for significant changes in the light-transmitting qualities of the electrolyte, the modified form of control arrangement shown in FIG. 9 can be utilized.

Figure 9:
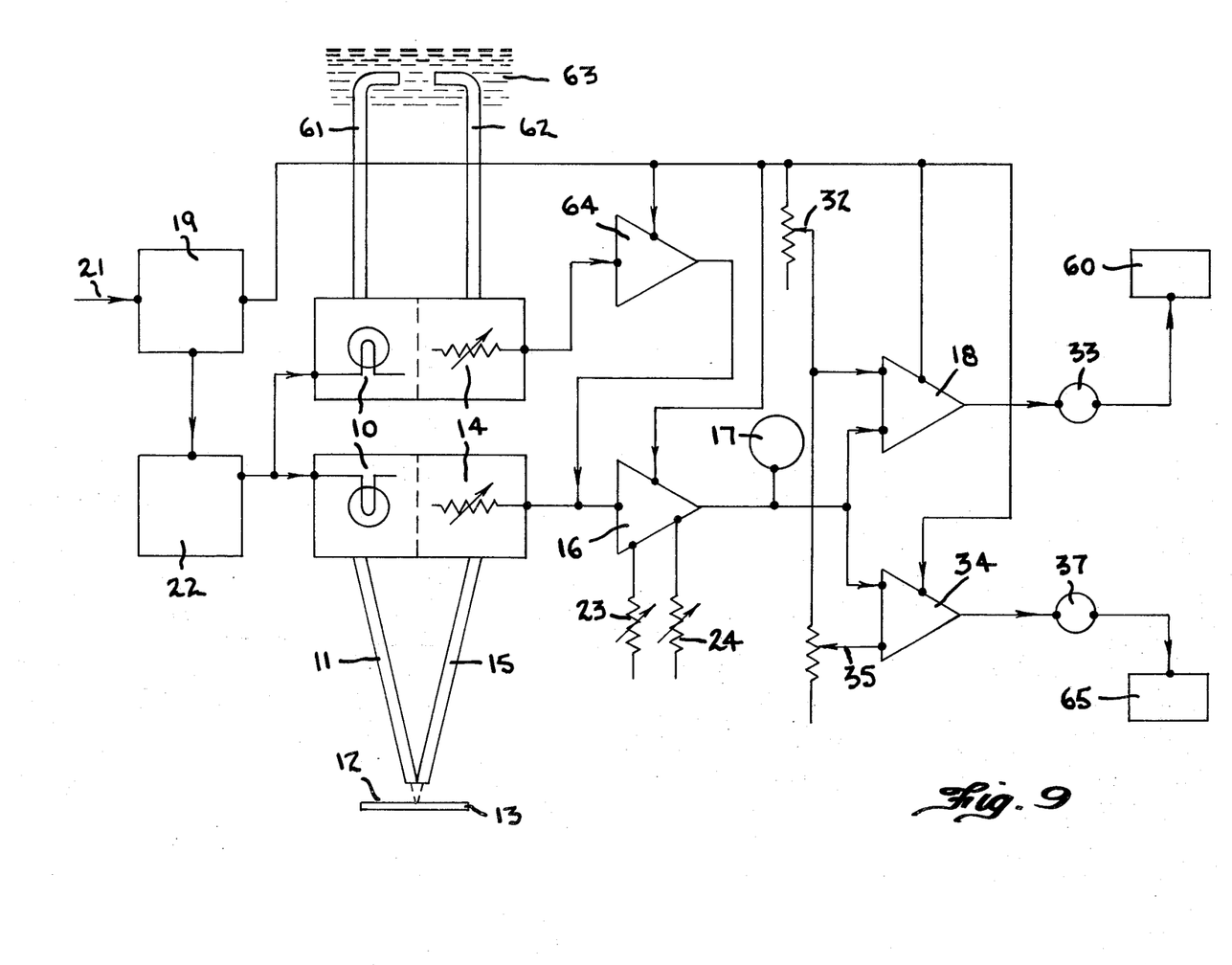
FIG. 9 is a schematic block diagram of another modification of the control system embodying the principles of the invention.

In the modified control system diagrammatically illustrated in FIG. 9, a second set of fiber optic light guides 61 and 62 are arranged with their sensing ends in spaced opposed relationship to each other, as indicated, and immersed in the electrolyte 63 throughout the electrolytic process. The light from the light source 10 is transmitted through light guide 61 and across the liquid gap between the light guides to the light guide 62, which transmits it to the transducer or photo-electric cell 14. The transduced electrical signal is fed to an inverting amplifier 64 which modulates the input to the amplifier 16 provided by the reflected signal from the work-piece 13. If there should be any significant change in the light transmitting qualities of the electrolyte 63, it is sensed by the light guides 61 and 62 and a compensating electrical adjustment is imposed on the input to the amplifier 16. When the target value set into the comparator 18 is attained, the relay 33 actuates the process-arrest circuit 60. When the modified control system of FIG. 9 is utilized in connection with the anodizing of large panels of aluminum and it is desired to minimize the halo effect, the second comparator 34 can be utilized to trip the relay 37 and actuate a process-modification circuit 65 to switch the electrolytic process from a constant current mode to a constant voltage mode as previously described.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In a reflectivity-responsive control system for electrolytic finishing apparatus utilizing an electrolyte bath for electrolysis of a work-piece, the combination of a photobeam, means for directing said photo-beam onto a reflecting surface of the work-piece, sensor means for sensing the intensity of reflection of said photo-beam from the work-piece, transducer means for converting said reflected photo-beam into measurable electrical values, electrical comparator means for continuously monitoring said electrical values and responsive to attainment by said electrical values of an established electrical target value, as said electrolytic finishing process proceeds, to actuate a process-arrest circuit, and standard-setting means electrically connected to said comparator means for establishing said target value therein.

2. A combination as defined in claim 1, wherein said standard-setting means is adjustable and comprises a variable resistance.

3. A combination as defined in claim 1, wherein said comparator means is a potentiometer.

4. A combination as defined in claim 1, wherein said standard-setting means comprises means for directing said photo-beam onto a reflecting surface of a work-standard element, second sensor means for sensing the intensity of reflection of said photo-beam from said work-standard element, and second transducer means for converting said second reflected photo-beam into a measurable electrical value establishing said target value for said comparator means.

5. A combination as defined in claim 1, including second means for directing said photo-beam through the electrolyte independently of said reflecting surface, second sensor means for sensing the intensity of transmission of said photo-beam as curtailed by its passage through a predetermined linear span of electrolyte, second transducer means for converting said transmitted photo-beam into measurable electrical values, and means for connecting said second transducer means to said first-named transducer means to modify the electrical value output thereof in response to changes in the light transmission characteristics of said electrolyte bath.

6. A combination as defined in claim 1, including a second electrical comparator means for monitoring said electrical values and responsive to attainment of a predetermined percentage of said established electrical target value, as said electrolytic finishing process proceeds, to actuate a process-modification circuit, and second standard-setting means electrically connected to said second comparator means for establishing said percentage of electrical target value therein.

7. A combination as defined in claim 6, wherein actuation of said process-modification circuit is coupled to said electrolysis circuit and is effective to change it from a constant current mode to a constant voltage mode.

8. A combination as defined in claim 1, wherein said means for directing said photo-beam onto a reflecting surface of the work-piece comprises a clamp having spaced work-piece-receiving jaws, a light-transmitting element carried by said clamp, means for connecting one end of said light-transmitting element to a light source, and means for beaming said transmitted light into the space between said jaws.

9. A combination as defined in claim 8, wherein said light-transmitting element is a fiber optic light guide.

10. A combination as defined in claim 8, including a second light-transmitting element carried by said clamp in light-receiving relationship to the reflecting surface of a work-piece clamped therein, and means for directing said reflected light transmitted by said second transmitting element to said transducer means.

11. A combination as defined in claim 10, wherein said second light-transmitting element is a fiber optic light guide.

References Cited

UNITED STATES PATENTS

| | | | |
|---|---|---|---|
| 3,562,133 | 2/1971 | Ward | 204—228 |
| 3,524,805 | 8/1970 | Engelman | 204—228 |
| 3,719,565 | 3/1973 | Herrmann | 204—228 X |

JOHN H. MACK, Primary Examiner

D. R. VALENTINE, Assistant Examiner

U.S. Cl. X.R.

204—58